United States Patent
Yu

(10) Patent No.: US 10,942,395 B2
(45) Date of Patent: Mar. 9, 2021

(54) DIRECT LIGHT-TYPE BACKLIGHT MODULE, DISPLAY DEVICE AND ITS ASSEMBLY METHOD

(71) Applicant: SUZHOU RAKEN TECHNOLOGY LIMITED, Jiangsu (CN)

(72) Inventor: Hung-Ta Yu, New Taipei (TW)

(73) Assignee: SUZHOU RAKEN TECHNOLOGY LIMITED, Suzhou (CN)

( * ) Notice: Subject to any disclaimer, the term of this patent is extended or adjusted under 35 U.S.C. 154(b) by 0 days.

(21) Appl. No.: 16/200,775

(22) Filed: Nov. 27, 2018

(65) Prior Publication Data

US 2019/0163022 A1    May 30, 2019

(30) Foreign Application Priority Data

Nov. 27, 2017    (TW) ................................ 10614121.7

(51) Int. Cl.
G02F 1/13357    (2006.01)

(52) U.S. Cl.
CPC .. *G02F 1/133611* (2013.01); *G02F 1/133603* (2013.01); *G02F 1/133605* (2013.01); *G02F 1/133608* (2013.01); *G02F 2001/133612* (2013.01)

(58) Field of Classification Search
CPC ......... G02F 1/133603; G02F 1/133605; G02F 1/133608; G02F 1/133611
See application file for complete search history.

(56) References Cited

U.S. PATENT DOCUMENTS

| 2011/0109814 | A1 | 5/2011 | Takemura |
| 2012/0063133 | A1* | 3/2012 | Takeuchi ......... G02F 1/133603 362/235 |
| 2012/0075551 | A1* | 3/2012 | Kuromizu ......... G02F 1/133608 349/61 |
| 2016/0018698 | A1 | 1/2016 | Su |
| 2016/0252775 | A1 | 9/2016 | Lu |

FOREIGN PATENT DOCUMENTS

| CN | 102072438 A | 5/2011 |
| CN | 103423675 A | 12/2013 |
| CN | 204100138 U | 1/2015 |
| TW | 201604624 A | 2/2016 |

\* cited by examiner

*Primary Examiner* — Thomas M Sember
(74) *Attorney, Agent, or Firm* — Nixon Peabody LLP

(57) ABSTRACT

A direct-light-type backlight module, a display device and its assembly method are disclosed in the present invention, wherein the backlight module comprises a plurality of LED strips, a reflector, a plurality of cover portions and a plurality of connectors. The LED strips respectively comprise a plurality of LED packages. The reflector is set above the LED strip. The reflector has a plurality of light openings and a plurality of cover openings, and the light openings match the LED packages respectively, so that the LED packages could pass the light openings of the reflector. The cover portions respectively connect one side of the cover openings on the reflector, and two adjacent cover portions at a row are crossover in a X-shaped way in a side view direction of the reflector. The connectors are disposed in the cover openings and are obliquely covered by the cover portions, and the connectors electrically connect to the LED strips. The present invention can significantly improve the uniformity of light intensities at the light-emitting surface, and the display quality is significantly improved.

19 Claims, 8 Drawing Sheets

DIRECT LIGHT-TYPE BACKLIGHT MODULE, DISPLAY DEVICE AND ITS ASSEMBLY METHOD

TECHNICAL FIELD

The present invention relates to the technology field of display device, particularly to a direct-light-type backlight module.

BACKGROUND OF INVENTION

The liquid crystal display device has the liquid crystal layer filled between two transparent substrates. The directions of the liquid crystal molecules can be changed by applying different voltages and thereby the light transmittances of the liquid crystal molecules are changed. By this way, the liquid crystal display device can display predetermined images. Since the liquid crystal itself is not an illuminant, an external backlight module is required as a light source. In recent years, the direct-light-type LED backlight module has been the mainly developed technology in the industry of backlight modules. The light source of the direct-light-type LED backlight module is the LED chips arranged on the one side of the light guide plate, so that the lights emitted by the LED chips directly enter the light guide plate which outputs lights to the liquid crystals. While the lights will diffuse and weaken as they move away from the LED chips, the light intensities at different areas of the liquid crystals display panel are not uniform.

Recently the resolutions of the liquid crystal display panels are greatly improved, however, if the light output surface of the backlight module has defect or the uniformity of the emitted lights is poor, the improved resolutions of the liquid crystal display panel could not be perceived by the viewers.

In order to uniformly distribute the lights on the liquid crystal panel, the lights emitted from the LED chips are spread in the optical cavity through the refraction of the secondary optical lens. In addition, common designs also include the optical materials, such as diffuser plates and optical films, installed above the lens. Part of the lights refracted by the secondary optical lens will pass through these optical materials and part of the lights will be reflected by these optical materials. For example, when a diffuser plate having transmittance of about 50% to 60% is installed above the lens, at least 40% of the lights are refracted through the diffuser plate or reflected back into the optical cavity by the diffuser plate. The lights reflected into the optical cavity will reenter into the diffuser plate and be diffused again, and eventually the lights will be uniformly distributed on the display panel. During the process of light diffusion, part of the diffused lights will be toward to the connectors installed in the backlight module, which causes a large percentage of the diffused lights to be absorbed by the non-reflective connector surfaces. Since only a small part of the diffused lights are reflected by the connectors, which not only makes the light utilization rate reduced, but also causes the light intensity of the light output surface nonuniform.

DISCLOSURE OF THE INVENTION

It's an object of the present invention to provide a direct-light-type backlight module, a display device and its assembly method.

In order to achieve the above object, the present invention applies the following technical solution:

A direct-light-type backlight module; it consists of:

A plurality of LED strips, each of the LED strip comprising a plurality of LED packages;

A reflector set above the LED strips, and the reflector has a plurality of light openings and a plurality of cover openings, and the light openings match the LEDs respectively, so that the LEDs could pass and be fixed on the reflector;

A plurality of cover portions, which are respectively connected to the one side of each of the cover openings, and two adjacent cover portions are crossover in a X-shaped way in a side view direction of the reflector;

A plurality of connectors, which are respectively disposed in each of the cover openings and are obliquely covered by the cover portions, and the connectors are electrically connected to each of the LED strips respectively.

The above described technical solution is explained as follows:

1. In above described technical solution, the light opening is a circular opening.

2. In above described technical solution, the cover portion is rectangular, and the cover opening has the same shape as the cover portion.

3. In above described technical solution, the connection side of the cover portion and the cover opening is connected by a linear bending section.

4. In above described technical solution, the cover portion has the same material as the reflector.

5. In above described technical solution, it further includes a plurality of supporting columns, an optical film set, a mating part and a back panel. Each of the supporting columns are disposed on the reflector, the optical film set is disposed on the supporting column and is supported by the supporting column, the mating part is used to set and electrically connect the LED strips and the connectors respectively, and the back panel is used to accommodate the mating part;

And the optical film set further includes a diffuser plate, a prism plate and a diffuser, which are sequentially stacked and disposed on the supporting column respectively.

In order to achieve the above object, the present invention applies another technical solution:

A display device; it consists of:

A display panel; and

A direct-light-type backlight module, providing the light source for the display panel, and the direct-light-type backlight module consists of:

A plurality of LED strips, each of the LED strip respectively comprising a plurality of LED packages;

A plurality of connectors, electrically connected to the LED strips respectively;

A reflector set above the LED strips, and the reflector has a plurality of light openings and a plurality of cover openings, and the light openings match the LEDs respectively, so that the LEDs could pass and be fixed on the reflector, and the cover openings match the connectors respectively;

A plurality of cover portions, which are respectively connected to the one side of each of the cover openings, and two cover portions at the same row are crossover in a X-shaped way in a side view direction of the reflector to obliquely cover the connectors respectively;

In order to achieve the above object, the present invention applies the following technical solution:

The assembly method of a display device; it includes:

To install a plurality of LED strips and a mating part on a casing and the LED strips contain a plurality of LED packages respectively and the mating part has a plurality of connectors, which are electrically connected to the LED strips respectively;

To install a reflector set above the LED strips, and the reflector has a plurality of light openings and a plurality of cover openings, and the light openings match the LEDs respectively, so that the LEDs could pass and be fixed on the reflector, and the cover openings match the connectors respectively and have a plurality of cover portions, and the cover portion is connected with the reflector with a single side respectively and obliquely covers the connector in the cover opening respectively, and two cover portions at the same row are crossover in a X-shaped way in a side view direction of the reflector;

To install an optical film set on the reflector; and

To install a display panel on the optical film set.

In the above described drawings: 100. Direct-light-type backlight module; 100P. Section; 110. LED strip; 210. LED strip; 110N. LED; 210N. Diode strip; 120. Reflector; 220. Reflector; 1202. Light opening; 1204. Cover opening; 1206 Exposed portion; 130. Cover portion; 140. Connector; 240. Connector; 150. Supporting column; 160. Optical film set; 1602. Diffuser plate; 1604. Prism plate; 1606. Diffuser; 170. Mating part; 180. Back panel; 2202. Hole; 230. Cover window; A. Angle; L. Long side; W. Short side; P. No-opening portion; O. Opening direction; O1. Opening direction; O2. Opening direction; O3. Opening direction; O4. Opening direction; 300. Display panel; 400. Assembly method; 410. Step 1; 420. Step 2; 430. Step 3; 440. Step 4.

SPECIFIC EMBODIMENT

With reference to the accompanying drawings and embodiment, the present invention will be described in detail.

The embodiments are described in detail below with reference to the accompanying drawings, but the embodiments are not intended to limit the scope of the present invention, and the description of the structure operation is not intended to limit the execution sequence, and any device that has been reassembled by the components and has the equivalent function is covered by the present invention. In addition, the drawings are for illustrative purposes only and are not drawn to the original dimensions. For ease of understanding, the same components or similar components in the following description will be indicated by the same numerals.

In addition, the terms used in the entire specification and the scope of the patent application, unless otherwise specified, usually have the usual meaning of each term used in this field, in the content of the present invention and in the special content. Certain terms used to describe the present invention are discussed below or elsewhere in this specification to provide additional guidance to those skilled in the art in the description of the present invention.

The terms "first", "second", . . . , etc., as used herein, are not intended to refer to the sequence or order, and are not intended to limit the invention, and they're merely to use the distinguish the components or operation described in the same technical terms.

Secondly, the terms "including", "consisting of", "having", and "containing", etc, as used herein, are all open terms, and they mean "including but not limited to".

Figure 1:
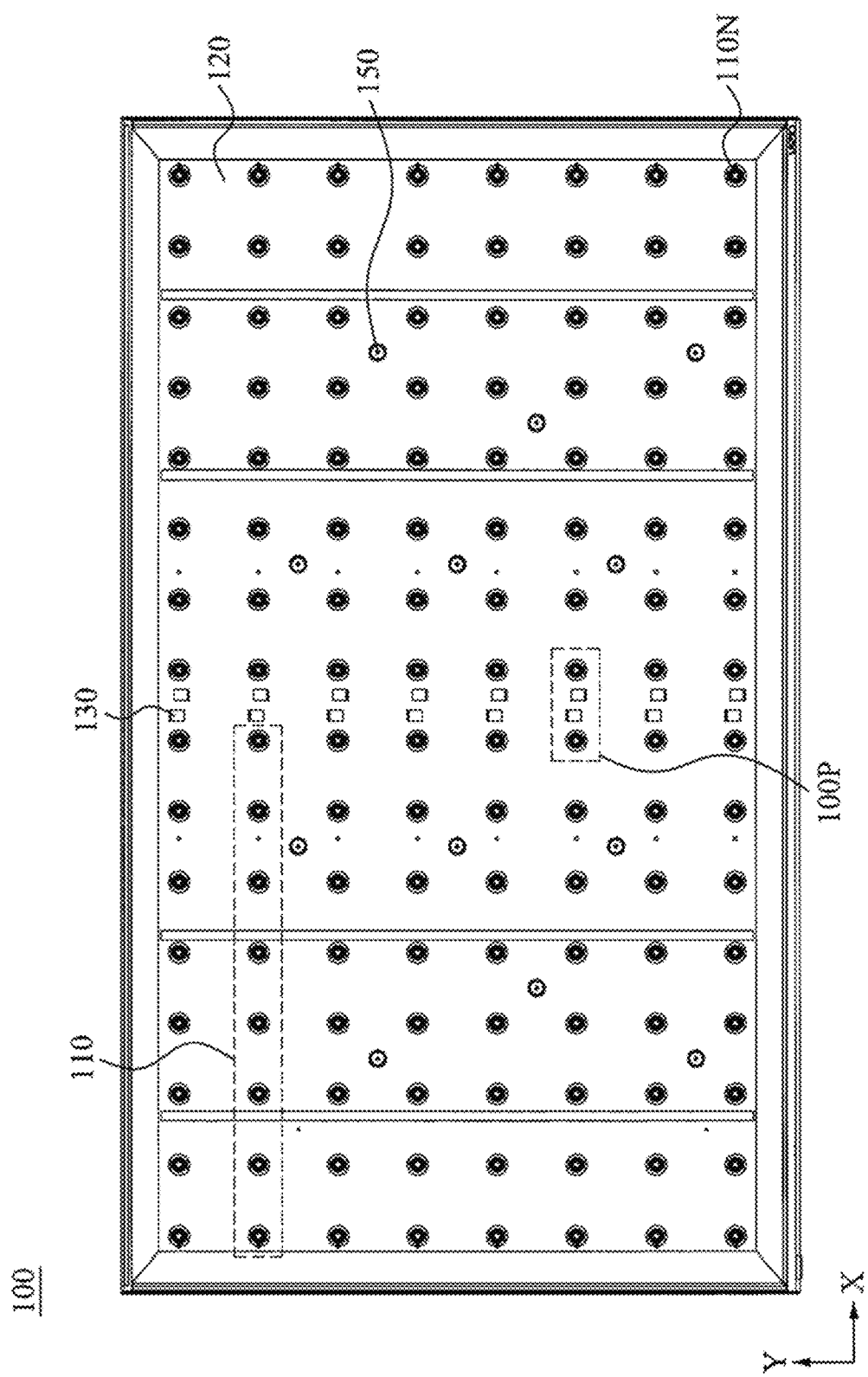
FIG. 1 is a top view of a direct-light-type backlight module according to one embodiment of present invention.
Figure 2:
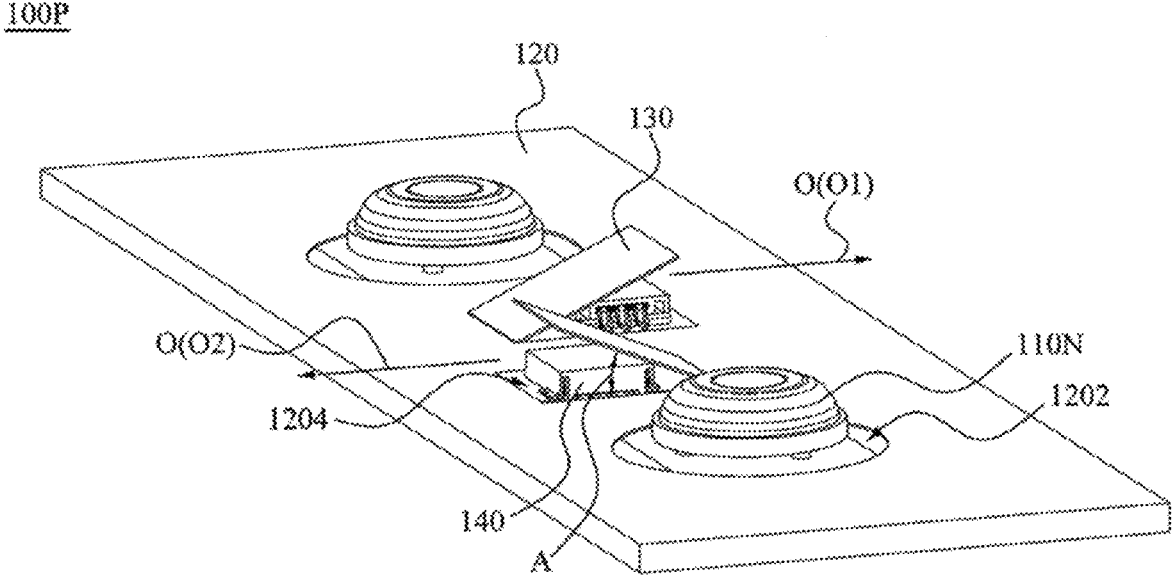
FIG. 2 is a schematic view of one section of a direct-light-type backlight module according to the embodiment in FIG. 1.
Figure 3:
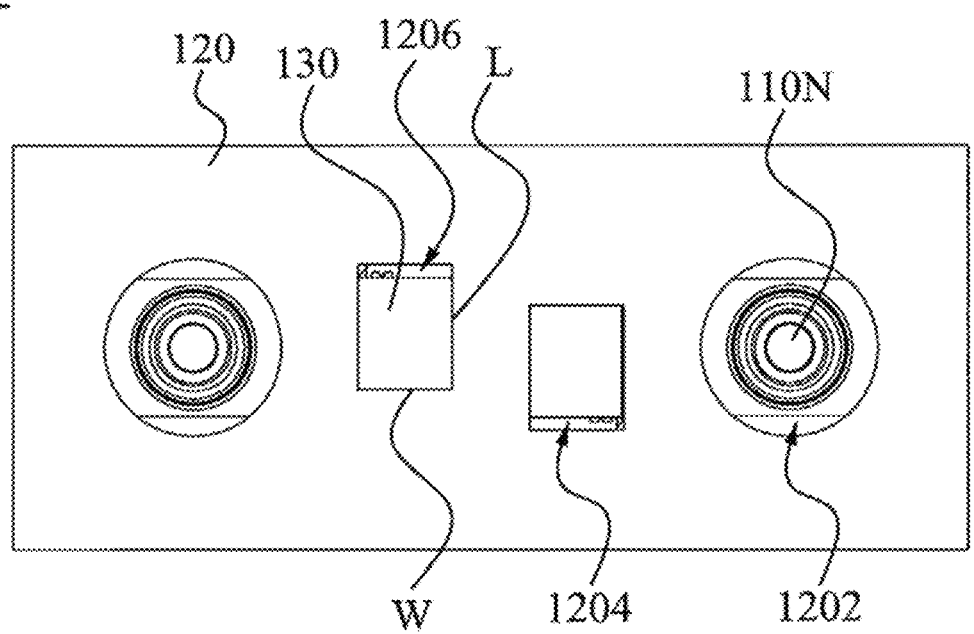
FIG. 3 is a top view of one section of a direct-light-type backlight module according to the embodiment in FIG. 1.

Please refer to FIGS. 1 to 3. FIG. 1 is a top view of a direct-light-type backlight module 100 according to one embodiment of present invention. FIG. 2 is the drawing showing the section 100P of the direct-light-type backlight module 100 according to the embodiment in FIG. 1. FIG. 3 is a top view of the section 100P of the direct-light-type backlight module 100 according to the embodiment in FIG. 1. The direct-light-type backlight module 100 of this embodiment includes a plurality of LED strips 100, a reflector 120, a plurality of cover portions 130 and a plurality of connectors 140. The LED strips 100 respectively comprise a plurality of LED packages 110N. The LED packages 110N may include red, green, blue or white light LED chip or chips. The LED packages 110N may also be high directivity type, standard type or scattering type. In addition, the LED packages 110N may be fully epoxy encapsulated, epoxy encapsulated with metal substrate, epoxy encapsulated with ceramic substrate or glass encapsulated.

The reflector 120 is set above the LED strips 110. The reflector 120 may be a silver reflective sheet or plate made by evaporation or a white reflective sheet or plate. In addition, the reflector 120 may be, but not limited to, a specular reflector or a matte reflector. The reflector 120 has a plurality of light openings 1202 and a plurality of cover openings 1204, and the LED packages 110N are located corresponding to the light openings 1202 respectively, so that as least part of the LED packages 110N could protrude through the reflector 120. In this embodiment, the light openings 1202 are circular openings but not limited to this. The light openings 1202 may also be openings with shapes of triangle, square, polygon, or the like.

In this embodiment, the cover portions 130 are respectively connected to the one side of the cover openings, and two adjacent cover portions 130 are crossover in a X-shaped way in a side view direction of the reflector 120 as shown in FIG. 2. In detail, two of the cover openings 1204 are located adjacently on the reflector 120 and two cover portions 130 are respectively disposed on each of the cover openings 1204. Each of the two cover portions 130 is connected to one side of the corresponding cover opening 1204 on the reflector 120. For example, the reflector 120 is cut in order to form the cover openings 1204 and the cover portions 130 are reflective parts which are partially cut from the cover openings 1204 on the reflector 120. If a cover portion 130 and its corresponding cover opening 1204 are quadrilateral, the single-sided connection means that only one side of the four sides of the quadrilateral is connected, so that the cover portion 130 is in a state of being movable or foldable relative to the cover opening 1204 or reflector 120.

In this embodiment, the cover portion 130 drawn in FIG. 2 and FIG. 3 is the rectangular having a long side L and a short side W, and the cover opening 1204 has the same shape as the cover portion 130. The cover opening 1204 connects the short side W of rectangular cover portion 130. At least one of the connectors 140 is located in one of the cover opening 1204. The cover portion 130 is at an angle A to its corresponding cover opening 1204 of the reflector 120, and the opening under the cover portion 130 is toward to a direction O. In addition, the connection side between the cover portion 130 and cover opening 1204 in this embodiment is a bending line section, which is preferably including a row of holes or line of cuts. The linear bending section is processed to form a 9:2 cut proportion, that is, $2/11$ of the length of bending line section connects the cover portion 130 and cover opening 1204 and $9/11$ of the length of bending line section is cut or disconnected. So the cover portion 130 could be bended or folded naturally. In an embodiment of the present invention, the cover portion 130 is lifted by the connector 140 easily when the reflector is installed above the LED strips 110, and thus the angle A between the cover portion 130 and the cover opening 1204 is formed.

In other embodiments, one cover portion 130 and its corresponding cover opening 1204 may also be triangular, polygonal, circular, or the like. In case of a triangle cover opening, the one-side connection means that only one side of the three sides of the triangle cover opening connects with the cover portion, so that the cover portion is in a state of being movable relative to the cover opening. In case of a circular cover opening, the one-side connection means that part of arc of the circular cover opening connects with the cover portion. In addition, the shape of the cover opening can also be different from the cover portion and the cover portion can still connect one side of the cover opening.

In the embodiment of FIGS. 1 to 3, the cover portion 130 and the reflector 120 have the same material in order to enhance the uniformity of the light intensity output from the light output surface. However, this is not limited in other embodiments, the cover portion 130 and the reflector 120 may be made of different materials. In addition, in the top view of FIG. 3, the exposed portion 1206 of cover opening 1204, which is not covered by the cover portion 130, can be coated with white reflective paint in order to enhance light reflection, so the uniformity of the light intensity output from the light output surface is improved.

In an embodiment of the present invention, the opening directions O formed by the two adjacent cover portions 130 and the corresponding cover openings 1204 are the opening direction O1 and the opening direction O2, as shown in FIG. 2 respectively. The opening direction O1 and the opening direction O2 are crossover and toward to the opposite directions. In addition, two adjacent cover portions 130 are crossover in a X-shaped way in a side view direction of the reflector 120. A plurality of connectors 140 are respectively disposed in the cover openings 1204 and are obliquely covered by the cover portions 130, and the connectors 140 electrically connect to the LED strips 110, respectively.

Figure 4:
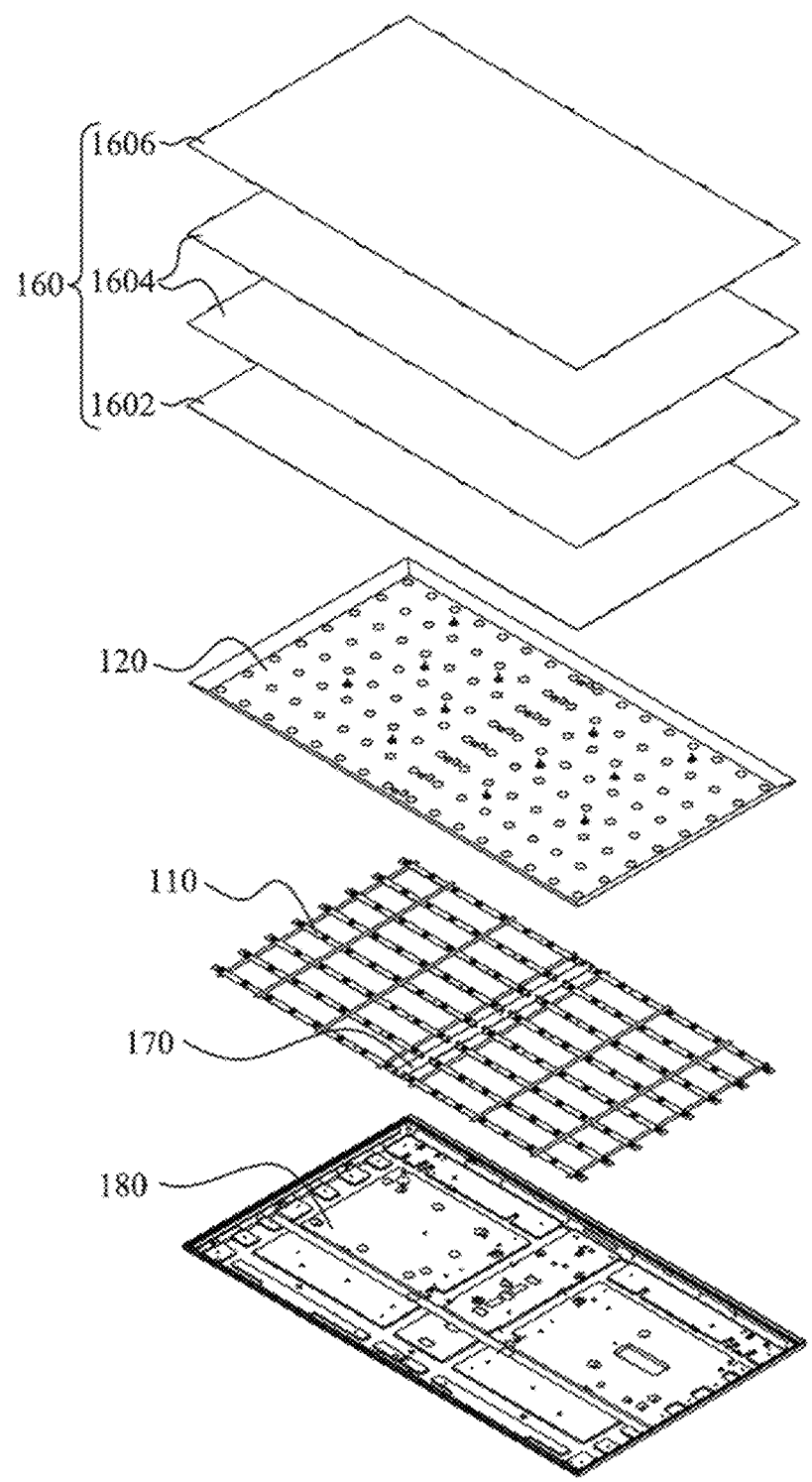
FIG. 4 is a schematic view of the arrangement position of the optical film set according to one embodiment of present invention.

FIG. 4 is a schematic view showing the arrangement of the optical film set 160 according to one embodiment of present invention. Please refer to FIGS. 1, 2 and 4. In some embodiments, the direct-light-type backlight module 100 further includes a plurality of supporting columns 150, an optical film set 160, a mating part 170, and a back panel 180. The supporting columns 150 are disposed on the reflector 120. The mating part 170 is used to fix the LED strips 110 and the connectors 140 so the LED strips 110 and the connectors 140 can be electrically connected. The back panel 180 is used to accommodate the mating part 170. The optical film set 160 is disposed on the supporting column 150 and supported by the supporting column 150. The length of the supporting column 150 can be selectively designed such that the optical film set 160 is disposed at an appropriate distance from the reflector 120, so the uniformity of the light intensity output from the light output surface is further improved. In the embodiment of FIG. 4, the optical film set 160 further optionally includes a diffuser plate 1602, a prism film 1604 and a diffuser film 1606, which are sequentially stacked and disposed on the supporting column 150 respectively.

The diffuser plate 1602 is used to improve the distribution of lights, so that the structures inside the backlight module, which are shown in FIG. 1, do not affect the distribution of lights. The outlines of the structures inside the backlight module are blurred in the output lights and a light source surface providing uniform blur lights is thus generated on the diffuser plate 1602. The diffuser plate 1602 can be made by coating the combination of diffusant and resin on the substrate of diffuser plate 1602. The diffusant may be the chemical particles which are painted between the resin layers and evenly spread, so the lights entering the diffuser plate 1602 will pass through the diffusant particles and the resin. Since the diffusant and the resin have different refractive rates, the lights will be diffused by these materials, wherein numberless light refractions, scatterings, and reflections occur and combine during the diffusion of the lights. Eventually, the diffuser plate 1602 outputs uniformly diffused lights.

The prism plate 1604, also known as the brightness enhancement film (BEF), is mainly used to improve the directions and brightness of the lights. The prism plate 1604 collects and gathers lights through light refractions and reflections. Because the light is diffused by the diffuser plate 1602, the directions of the lights output from the diffuser are not uniformly toward to the display panel. The purpose of installing the prism plate 1604 is to adjust the directions of the lights, which could enhance the brightness of the lights greatly, such as increase more than 1.5 times than the designs without the prism plate 1604. The material of the prism plate 1604 could be polycarbonate or polyester, and the structures of the prisms may be semi-cylinder or prismatic cylinder on a surface of the prism plate 1604. The prism plate 1604 can also be a set of two prism plates which are stacked one on another, and the prisms of one prism plate are perpendicular to the prisms of the other prism plate, thereby further improving light directivity and brightness. For example, the prism plates 1604 shown in FIG. 4 is a set of two prism plates.

The diffuser film 1606 functions similarly to the diffuser plate 1602, but may have a lower degree of blur effect and a higher degree of transmittance compared with the diffuser plate 1602. In addition, the diffuser 1606 can blur the textures and contours of prism plate 1604 brought in the lights entered from prism plate 1604 and provide protection to the prism plate 1604 from scratching.

Figure 5A:
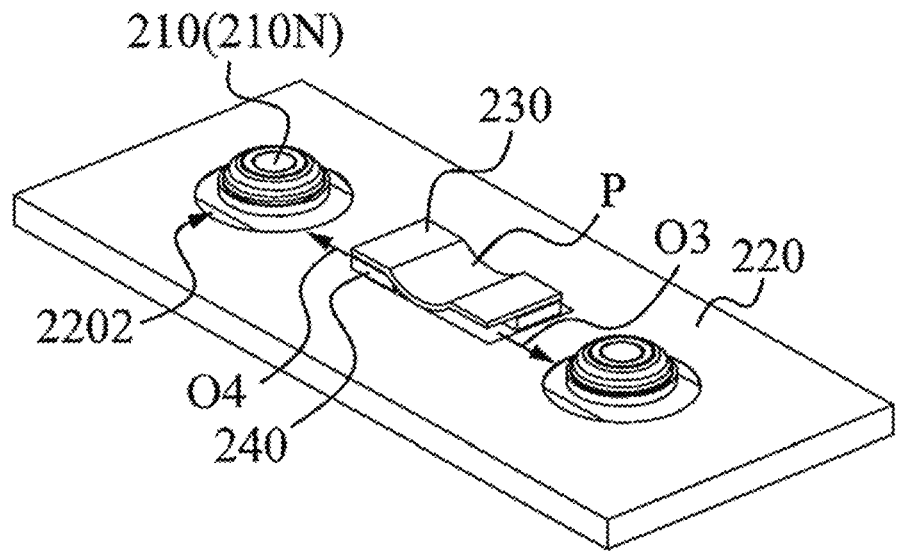
FIG. 5A is a structure drawing of a reflector for performing light intensity simulation according to an embodiment of the prior art.

Please refer to FIG. 5A to 5D. Since the purpose of the present invention is intended to improve the uniformity of light emitting from the backlight module, thus the simulation experiments are performed in order to compare various prior art solutions for solving similar problem with the embodiment of the present invention. FIG. 5A is a structure drawing showing an embodiment of the prior art, which disclosed another reflector for improving the uniformity of light emitting. The embodiment of prior art as shown in FIG. 5A has a plurality of LED strips 210 and each strip comprises a plurality of LED packages 210N. Each LED strip 210 is connected to a connector 240. The LED strip 210 is provided with a reflector plate 220. The reflector plate 220 is provided with a hole 2202 through which the LED packages 210N passes. The reflector plate 220 is provided with cover windows 230 at a position corresponding to the connector 240, and one side of the cover windows 230 are connected to the main body of the reflector plate 220 and the cover windows 230 connect the reflector plate 220 in pairs. The connectors 240 in the cover windows 230 are provided to connect the opposite ends of the two adjacent LED strips 210, so that the connectors 240 are arranged in pairs, and the opening directions O3, O4 of the cover windows 230 are arranged corresponding to each of two connectors 240 respectively. The cover windows 230 are formed by being cut along the three sides of a rectangle on the reflector plate 220 and leaving one side connected to the main body of the reflector plate 220. The openings of the paired cover windows 230 are not intersected and the unopened portion P is integrally connected to the reflector plate.

Figure 5B:
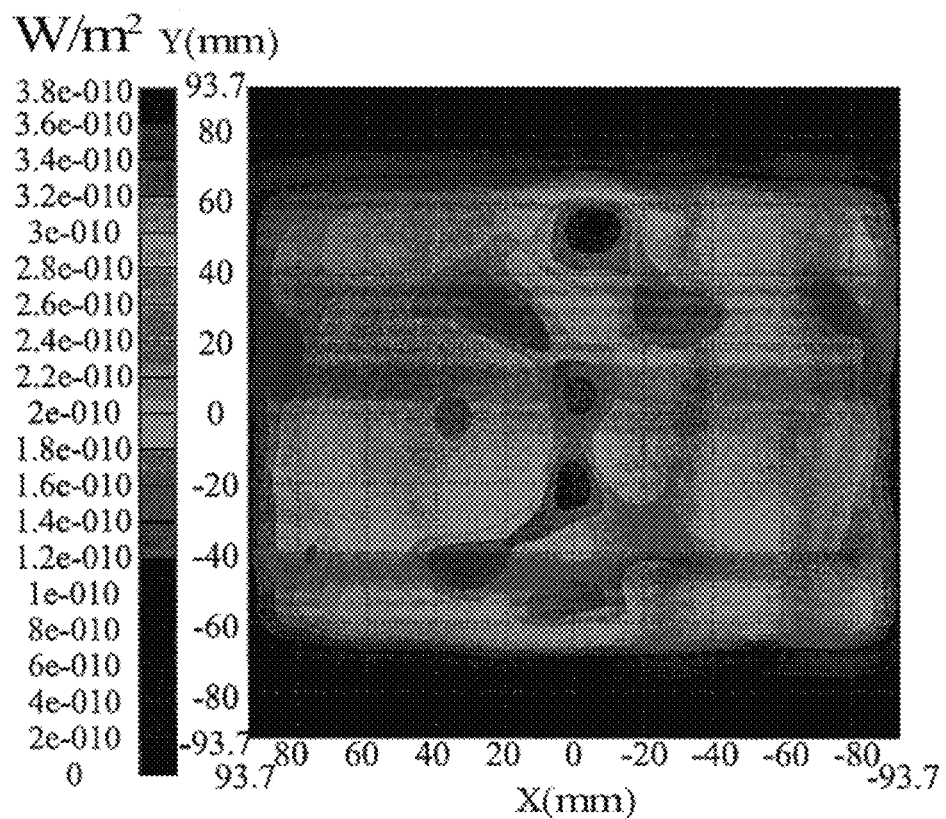
FIG. 5B is a data graph of light intensity simulation according to the embodiment in FIG. 5A.

FIG. 5B is a graph of the simulation results showing light intensities based on the reflector design in FIG. 5A. The graph of simulated light intensities shows the light intensities at the light-emitting direction of the reflector in FIG. 5A, that is, the light intensity simulation is performed based on the reflector plate 220 in FIG. 5A as the light-emitting surface. FIG. 5B clearly shows that in the area from plus minus 20 mm to plus 20 mm of X-axis, which is the area where the connector 240 is located, there are many local peaks of light intensities. Thus, the nonuniformity of light intensities in the area where the connector 240 is located remains to be further improved.

Figure 5C:
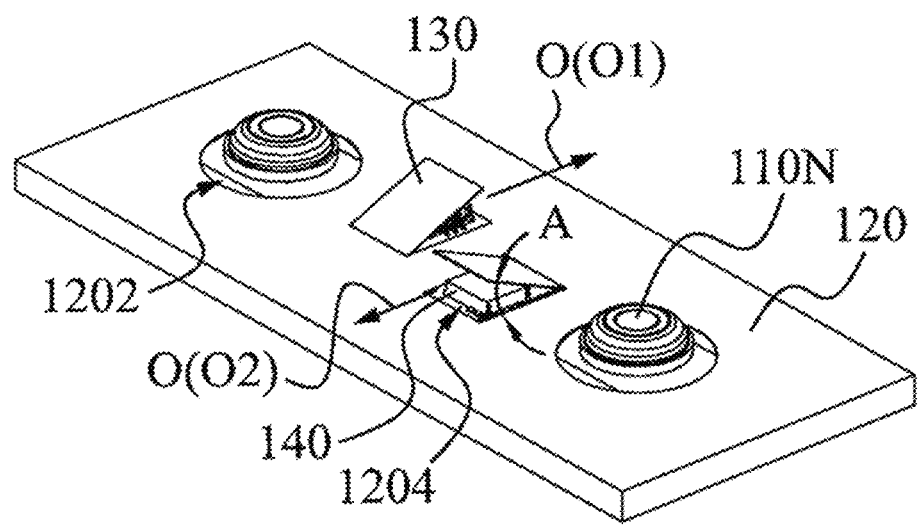
FIG. 5C is a structure drawing of a reflector for performing light intensity simulation according to the embodiment from FIGS. 1 to 3.

FIG. 5C is a structure drawing of a reflector 120 for performing light intensity simulation according to the embodiment from FIGS. 1 to 3. The structure of the reflector 120 has been described in detail in the paragraphs of FIGS. 1 to 3.

Figure 5D:
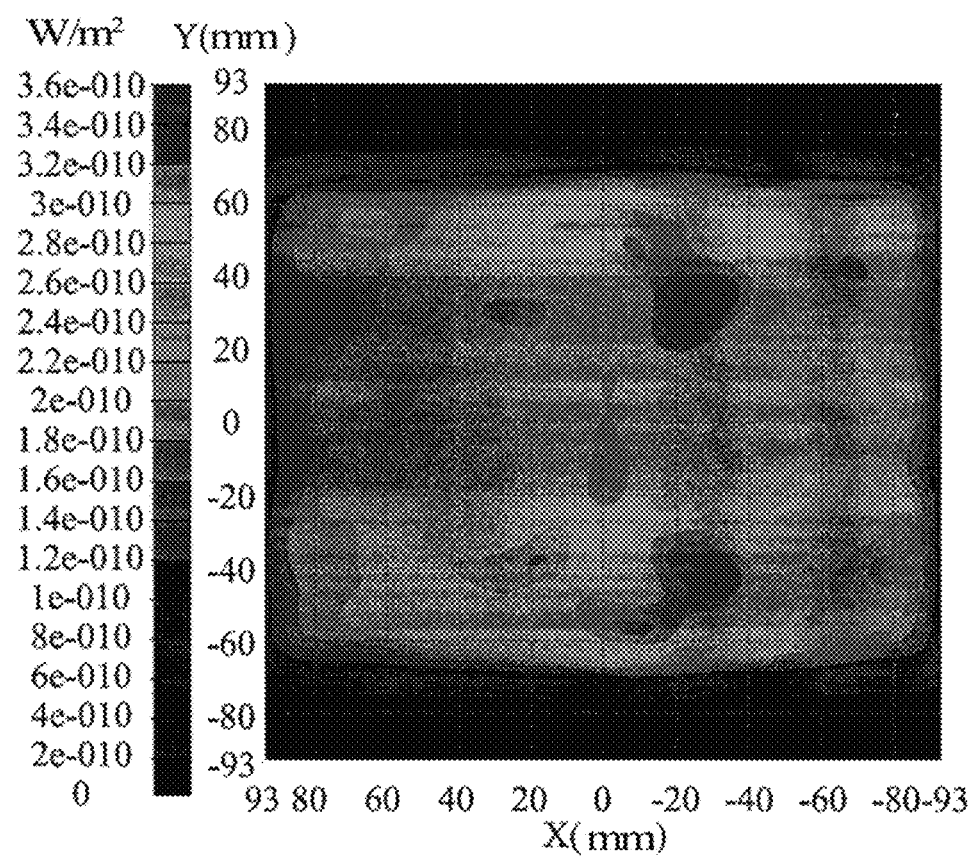
FIG. 5D is a data graph of light intensity simulation according to the embodiment in FIG. 5C.

FIG. 5D is a graph of the simulation results showing the light intensities at the light-emitting direction of the reflector 120 in FIG. 5C. Please refer to FIGS. 2, 5C and 5D at the same time. The graph of the simulation results in FIG. 5D shows that the structure of the embodiment in the present invention provides better light intensity distributed uniformity at the area near the connector 140 than the FIG. 5B based on the prior art structure in FIG. 5A. The FIG. 5D shows more uniform light intensities are provided by the structure where in two adjacent cover portions 130 are crossover in a X-shaped way. Thus, the display quality of the display devices will be improved when utilizing the structure of direct-light-type backlight module 100 according to the embodiment of present invention, for example, the display screen will have receives more uniform light intensities from the backlight module.

In the embodiment of FIGS. 5C and 5D, the area between the pair of connectors 140 in the structural design of the present embodiment is kept flat, and the cover portions 130 are crossover in a X-shaped way, so the lights are prevented from unevenly scattering and thus the light intensities are not much affected by the connectors 140. The uniformity of the light intensities from the backlight module is therefore improved. In addition, the bending cover portions 130 pairs make X-shaped structures in the side view of the reflector 120, which lead the scattered lights to compensate the nonuniform brightness areas where the connectors 140 are located. The bending angle A of the cover portion is preferred between 5 to 35 degrees, which could achieve better uniformity of reflected lights.

In summary, the direct-light-type backlight module disclosed in some embodiments of the present invention provide the cover portion at an angle from the cover opening of the connector, and the material of the cover portion is same as the reflector. The cover portion is lifted by the connector and covers the connector. Two adjacent cover portions are crossover in a X-shaped way in a side view direction of the reflector. Through the X-shaped structure of crossover cover portions, the direct-light-type backlight module in the embodiments of the present invention can significantly improve the uniformity of the light intensities at the light-emitting surface, and thus the display quality is significantly improved.

Figure 6:
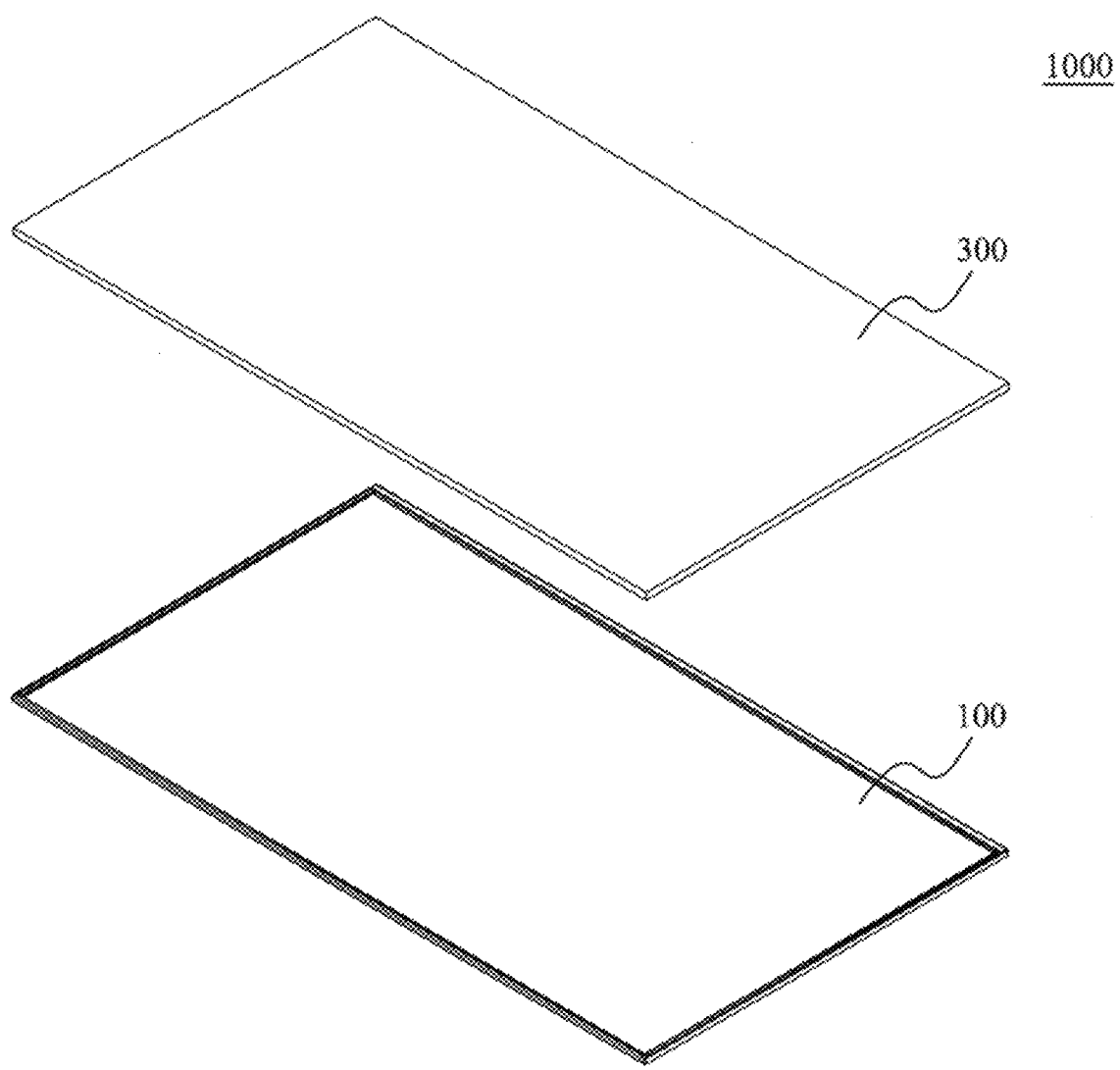
FIG. 6 is an exploded view showing the structure of a display device according to one embodiment of the present invention.

FIG. 6 shows a display device including a display panel 300 and the direct-light-type backlight module 100. The direct-light-type backlight module 100 is the light source of the display panel 300.

Figure 7:
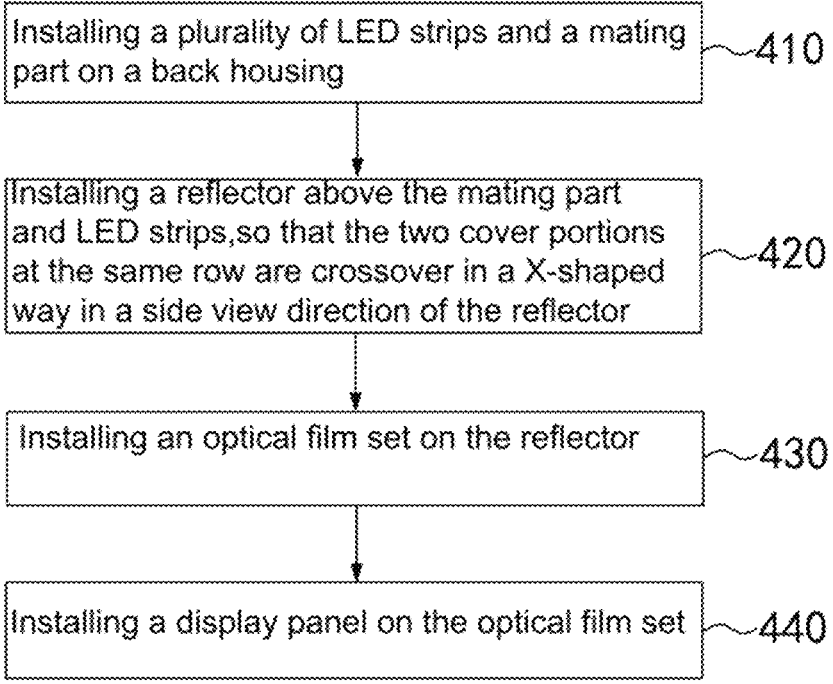
FIG. 7 is a block diagram of the assembly method of one embodiment of the present invention.

FIG. 7 shows the assembly method of a display device, which comprises:

Step I S410: Installing a plurality of LED strips and a mating part on a casing of the display device, such as a back plate or back housing. The LED strips contain a plurality of LED packages and the mating part has a plurality of connectors electrically connected to the LED strips respectively.

Step II S420: Installing a reflector above the LED strips, wherein the reflector has a plurality of light openings and a plurality of cover openings. The light openings match the LED packages respectively, so that the LEDs could pass the light openings of the reflector. The cover openings match the connectors respectively and have a plurality of cover portions, and the cover portions are connected to a side of the cover openings respectively on the reflector. The cover portions obliquely cover the connectors in the cover openings respectively, and two cover portions at the same row are crossover in a X-shaped way in a side view direction of the reflector.

Step III S430: Installing an optical film set on the reflector; and

Step IV S440: Installing a display panel on the optical film set.

It should be noted that the above described embodiments are only for illustration of technical concept and characteristics of present invention with purpose of making those skilled in the art understand the present invention, and thus these embodiments shall not limit the protection range of present invention. The equivalent changes or modifications according to spiritual essence of present invention shall fall in the protection scope of present invention.

What is claimed is:
1. A backlight module, comprising:
a plurality of LED strips, wherein at least one of the LED strips includes a plurality of LED packages;
a reflector being set above the LED strips, wherein the reflector has a plurality of light openings and a plurality of cover openings, and at least one of the LED packages protrudes through at least one of the light openings; and
a plurality of connectors disposed in the cover openings and electrically connected to the LED strips;

wherein two of the cover openings are located adjacently on the reflector, each of the two adjacent cover openings has a cover portion connected to one side of the one of the two adjacent cover openings and the cover portion is obliquely covering at least one of the connectors disposed in the one of the two adjacent cover openings, and the two cover portions are crossover in a side view.

2. The backlight module of claim 1, wherein the light openings are circular openings.

3. The backlight module of claim 1, wherein the cover portions of the at least two adjacent cover openings are rectangular.

4. The backlight module of claim 1, wherein the one side of the cover opening connected by the cover portion is a bending line portion.

5. The backlight module of claim 1, further comprising: a plurality of supporting elements and an optical film set, the optical film set is disposed at a distance from the reflector and supported by the supporting elements.

6. The backlight module of claim 1, further comprising: a mating element and a back plate, wherein the mating element electrically connects the LED strips and the connectors, and the back plate accommodates the mating part.

7. A display device, comprising:
a display panel; and
a backlight module providing light for the display panel, wherein the backlight module comprises:
a plurality of LED strips, wherein at least one of the LED strips includes a plurality of LED packages;
a reflector being set above the LED strips, wherein the reflector has a plurality of light openings and a plurality of cover openings, and at least one of the LED packages protrudes through at least one of the light openings; and
a plurality of connectors disposed in the cover openings and electrically connected to the LED strips;
wherein two of the cover openings are located adjacently on the reflector, each of the two adjacent cover openings has a cover portion connected to one side of the one of the two adjacent cover openings and the cover portion is obliquely covering at least one of the connectors disposed in the one of the two adjacent cover openings, and the two cover portions are crossover in a side view.

8. The display device of claim 7, wherein the light openings are circular openings.

9. The display device of claim 7, wherein the cover portions of the at least two adjacent cover openings are rectangular.

10. The display device of claim 7, wherein the one side of the cover opening connected by the cover portion is a bending line portion.

11. The display device of claim 7, further comprising: a plurality of supporting elements and an optical film set, the optical film set is disposed between the reflector and the display panel, and the optical film set is supported by the supporting elements.

12. The display device of claim 7, further comprising: a mating element and a back plate, wherein the mating element electrically connects the LED strips and the connectors, and the back plate accommodates the mating part.

13. The display device of claim 7, further comprising: a plurality of supporting elements and an optical film set, the optical film set is disposed at a distance from the reflector and supported by the supporting elements.

14. A method of assembling a display device, comprising steps of:
installing a plurality of LED strips on a back plate of the display device, wherein at least one of the LED strips includes a plurality of LED packages;
installing a plurality of connectors which are electrically connected to the LED strips on the back plate of the display device; and
installing a reflector above the LED strips, wherein the reflector has a plurality of light openings and a plurality of cover openings, and at least one of the LED packages protrudes through at least one of the light openings, and the connectors are disposed in the cover openings;
wherein two of the cover openings are located adjacently on the reflector, each of the two adjacent cover openings has a cover portion connected to one side of the one of the two adjacent cover openings and the cover portion is obliquely covering at least one of the connectors disposed in the one of the two adjacent cover openings, and the two cover portions are crossover in a side view.

15. The method of assembling a display device of claim 14, further comprising: bending up the cover portions of the two adjacent cover openings such that the two cover portions are crossover in a side view.

16. The method of assembling a display device of claim 14, further comprising:
installing an optical film set which is disposed at a distance from the reflector; and
installing a display panel above the optical film set.

17. The method of assembling a display device of claim 14, further comprising:
installing a mating element which is accommodated by the back plate, wherein the mating element electrically connects the LED strips and the connectors.

18. The method of assembling a display device of claim 14, further comprising:
cutting the reflector to form the cover openings and the light openings; and
processing to form bending line portions on the two adjacent cover openings of the reflector.

19. The method of assembling a display device of claim 14, wherein the cover portion contacts the at least one of the connectors disposed in the one of the two adjacent cover opening.

* * * * *